United States Patent [19]

Frye

[11] Patent Number: 4,756,498
[45] Date of Patent: Jul. 12, 1988

[54] ARTICLE HOLDING DEVICE

[76] Inventor: Bruce J. Frye, P.O. Box 483, Milltown, Wis. 54858

[21] Appl. No.: 74,618

[22] Filed: Jul. 17, 1987

[51] Int. Cl.⁴ .............................................. A47F 7/14
[52] U.S. Cl. ................................ 248/205.3; 248/339; 248/467
[58] Field of Search ................. 248/205.3, 205.4, 467, 248/497, 498, 489, 301, 339, 304, 341; 24/304, 230.5 R, DIG. 11

[56] References Cited

U.S. PATENT DOCUMENTS

| | | | |
|---|---|---|---|
| 1,814,303 | 7/1931 | Finlay | 248/304 X |
| 3,052,436 | 9/1962 | Marqulis | 248/341 X |
| 3,241,795 | 3/1966 | Frye | 248/28 |
| 3,311,339 | 3/1967 | Frye | 248/205.3 |
| 3,633,865 | 1/1972 | Hogg | 248/467 |
| 3,885,768 | 5/1975 | Frye | 248/467 |
| 4,003,538 | 1/1977 | Frye | 248/467 |
| 4,106,741 | 8/1978 | Hogg | 248/467 |
| 4,310,137 | 1/1982 | Frye | 248/467 |
| 4,671,480 | 6/1987 | Frye | 248/205.3 |

Primary Examiner—David L. Talbott
Attorney, Agent, or Firm—Leo Gregory

[57] ABSTRACT

A surface mounted article holding device adhesively attached to a supporting surface, the device havng a thin flexible surface attaching layer from which for removal of the device, the remainder of the device is first detached and subsequently the thin layer is peeled from the surface, the device including a relatively thin web connecting the wall attaching portion of the device with a depending article holding portion thereof, the web being forwardly of the body portion and remote from the engagement of the body portion with the supporting surface, the thickness of the shoulder forming a barrier to inhibit peel back of the edges of the body portion adjacent the holding surface and thus increasing substantially the otherwise holding capacity of the device.

3 Claims, 1 Drawing Sheet

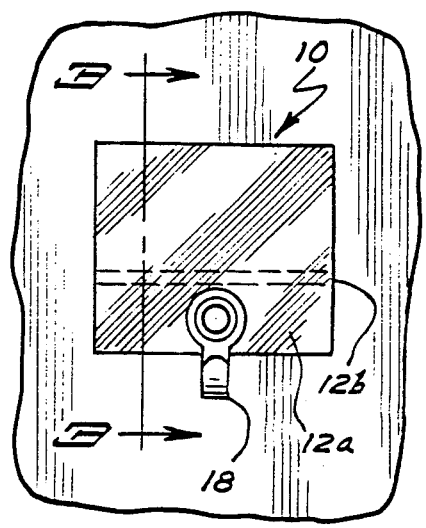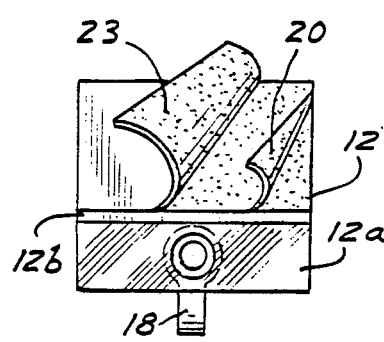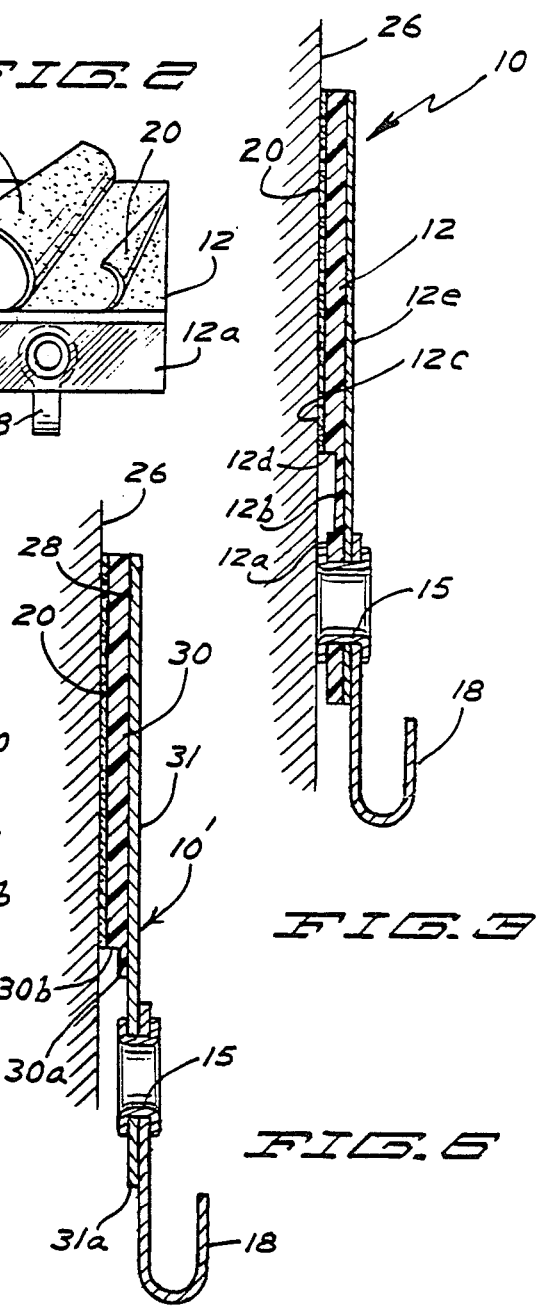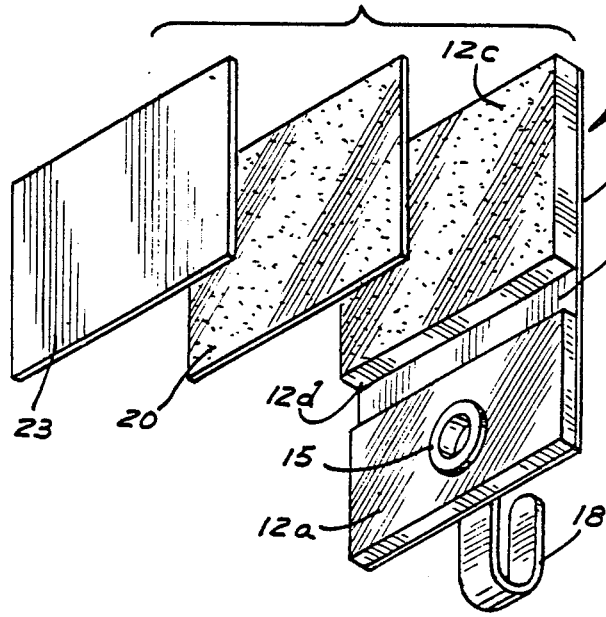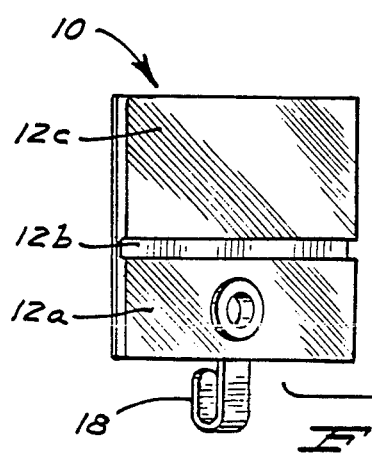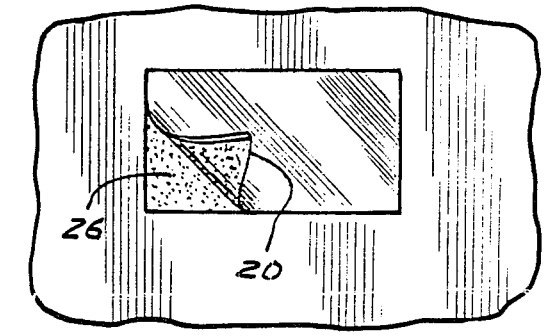

1

ARTICLE HOLDING DEVICE

BACKGROUND OF THE INVENTION

1. Field of Invention

This invention relates to an article holding device particularly adapted to have unusual holding capacity and to be removable from a supporting surface without damage to the surface.

2. Description of the Prior Art

Adhesively secured article holding devices or hangers are in common use.

Generally such hangers are made to have sheer strength and tear strength whether formed as a laminated structure or of a single piece of material. This is indicated generally in prior patents issued to the inventor herein with reference to his U.S. Pat. Nos. 3,241,795; 3,885,768, 4,003,538 and 4,310,137.

It is desirable to have an adhesively secured hanger particularly adpted to avoid peel back and which is separable upon removal whereby the surface secured layer is separately removed without damage to the supporting surface.

SUMMARY OF THE INVENTION

This invention relates to improvement in an adhesively secured hanger both as to removal from a supporting wall surface and as to an increase in holding capacity.

It is the purpose herein to provide a fairly small hanger which has relatively great holding capacity due in a large measure to its avoidance of peel back.

It is also a purpose herein to provide a hanger of laminated structure having a thin flexible securing layer from which the remainder of the hanger is first separated for removal and subsequently said thin layer is carefully rolled off the supporting surface.

It is another object of this invention to provide a hanger having a layered body portion having a relatively thin flexible web depending therefrom and having a hook member secured thereto.

It is more specifically an object herein to provide a hanger having a very thin flexible surface holding layer readily peelable from a holding surface and secured to the body portion of the hanger, a relatively thin web depending from the outer face portion of said body portion, a fairly rigid strip depending from said web and a holding member carried by said strip.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a front elevational view of the hanger herein mounted in operating position;

FIG. 2 is a view in rear elevation showing layers thereof partially peeled away;

FIG. 3 is a view in vertical section taken on line 3—3 of FIG. 1 as indicated;

FIG. 4 is an exploded view in perspective;

FIG. 5 is a composite front perspective view of the hanger herein removed from a rear layer thereof which is shown being peeled away from a supporting surface; and FIG. 6 is a view similar to that of FIG. 5 showing a modification.

DESCRIPTION OF A PREFERRED EMBODIMENT

Referring to the drawings, the structure comprising the invention of a hanger herein is indicated generally by the reference numeral 10.

In a preferred embodiment, said hanger has a body portion 12 shown herein as being rectangular in plan. For hangers to have substantial holding capacity, it has been found that the body portions thereof must have some thickness. A body thickness on the order of 0.050 inches provides a very good holding capacity. Preferably said body portion is formed of a PVC material having sufficient resilience or yielding effect to have intimate engagement with a textured or uneven wall surface.

Said body portion is formed to have depending from its face surface portion an extension 12a and extending transversely of said body member intermediate said extension and said body portion, there is formed a relatively thin web 12b here indicated as being on the order of 0.020 inches thick. Said web is formed by reducing in thickness a transverse strip of said body portion of which is formed said web.

Secured centrally of said extension by an eyelet 15 is a hook member 18.

Secured by a molecular adhesion to the surface 12c of said body portion 12 is a very thin layer 20 of a non-stretchable plastic material. This is a very flexible layer having a thickness on the order of only 0.00025 inches. The body portion being formed of a PVC material has a natural adhesion to a smooth plastic surface. This layer forms a very thin interface between the supported surface 12c of said body member 12 and the supporting surface 26. Said interface layer is adhesively coated on the side thereof which will be applied to a supporting surface.

Overlying said layer 20 is a protective coverstrip 23 such as is in common use for such purpose.

The web 12b formed between the extension 12a and said body portion 12 because of its relative thinness forms a shoulder 12d with the adjacent body portion and the effect of the web is to provide a recess or in other words, the web depends from the front surface portion of the body portion 12. The hook in being secured to said extension 12a depends from the front surface portion 12e of said body portion 12. Said shoulder is on the order of 0.030 inches in thickness.

The weight of a supported article is borne initially at the outer edge of the shoulder 12d remote from the underlying supporting surface 26. Hence the thickness of the shoulder is a buffer as to pull at the contact points 12f at which the shoulder 12d engages the surface 26.

An object held by the hook 18, such as a picture, will have a natural tendency to have its upper portion lean outwardly away from the supporting surface and to have its lower edge portion bear against the surface. The pull of the held object is outwardly of the shoulder 12d. The essential element here that inhibits peel back at the juncture of the shoulder 12d and the supporting surface is the thickness of the shoulder acting as a buffer and as above described, the web 12b depends from the front or forward surface portion 12e of said body portion 12. This specific structure clearly distinguishes from the structure of the U.S. Pat. No. 4,003,538.

The inclusion of the shoulder 12d in the structure herein has been found to provide an increased holding capacity having a depth or thickness on the order of 0.030 inches exclusive of the web thickness which preferably is on the order of 0.020 inches.

The body portion 12 as a whole supports the weight carried by the hook 18 and the thickness of the shoulder 12d in inhibiting peel back greatly enhances the holding capacity providing a holding capacity which has proved to be beyond that of like sized hangers.

As indicated in the above description, the thickness of the shoulder 12d acts as a buffer in resisting or inhibiting peel back from the supporting surface or from the interface layer. As described, said shoulder has caused the hanger to have unusual holding capacity.

In the removal of said hanger, the interface layer 20 has a stronger adherence to the supporting surface than it does to the adjacent surface 12c of the body portion 12. The adhesive securing said layer to the supporting surface has a greater holding power than the natural adherence of said layer with the adjacent surface of said body portion.

Thus in removing said hanger from a holding position, an outward pull in grasping, for example, the hook 10 will cause a separation of said body portion 12 from the interface layer 20. Said interface layer, which is very flexible, may subsequently be peeled away from a supporting surface by in effect being gently rolled up in being removed and the roll up action will readily separate said interface layer from a supporting surface with no noticeable damage to the surface from which it is removed.

With reference to FIG. 6, a modification is shown in which the modified hanger member is indicated by the reference numeral 10'.

Like parts of said modification will bear the same reference numerals as their counterparts previously described.

Said modification 10' consists of an intermediary body portion 30 preferably formed of a PVC material which is adhesively secured to an outer layer 31 having depending therefrom an extension 31a, said extension having a hook 18 secured thereto by an eyelit 15. Said body portion 30 has a downward extension 30a of reduced thickness forming a shoulder 30b.

A thin sheet 28 of a non-stretchable polyester material, such as sheet 20, serves as an interface between the layer 30 with its extension 30a and the layer 31. Said sheet 28 prevents the migration of plasticizer between the two layers as does said sheet 20 where used. Said sheet 28 will be secured by a suitable adhesive.

A sheet 20 serves as an interface between said layer or body portion 30 and a supporting surface 26. Said sheet 20 will adhere to the PVC layer 30 by what is termed molecular adhesion and will be secured to a supporting surface by a suitable adhesive.

In this modification, the layer 30 may be attached as described to a state of the art holding member or hanger and cause the state of the art hanger to have a substantially greater holding capacity and be removable from a supporting surface without damage to the surface.

It will of course be understood that various changes may be made in the form, details, arrangement and proportions of the product without departing from the scope of applicant's invention which, generally stated, consists in a product capable of carrying out the objects above set forth, such as disclosed and defined in the appended claims.

What is claimed is:

1. A self securing article holding device having in combination
    a body member,
    a depending extension of said body member from the front surface portion thereof,
    a web intermediate said body member and said extension thereof,
    said web having a reduced thickness relative to said body member and to said extension and forming a shoulder with the adjacent rearward portion of said body member,
    a thin sheet of flexible non-stretchable material having one side having natural adhesion to the rearward surface of said body member and having it's other side adhesively coated for adhesion to a supporting surface, and
    a hook secured to said extension.

2. The structure of claim 1, wherein said body member is preferably formed of a PVC material.

3. The structure of claim 1, wherein said thin sheet of material is preferably formed of a polyester material.

* * * * *